(12) United States Patent
Krumm et al.

(10) Patent No.: US 12,420,358 B2
(45) Date of Patent: Sep. 23, 2025

(54) METHOD FOR LASER MACHINING A WORK PIECE

(71) Applicant: ROLLOMATIC S.A, Le Landeron (CH)

(72) Inventors: Christian Krumm, Cortebert (CH); Mouhamadali Freidy, Renens (CH)

(73) Assignee: ROLLOMATIC S.A, le Landeron (CH)

( * ) Notice: Subject to any disclaimer, the term of this patent is extended or adjusted under 35 U.S.C. 154(b) by 0 days.

(21) Appl. No.: 18/921,305

(22) Filed: Oct. 21, 2024

(65) Prior Publication Data

US 2025/0114873 A1     Apr. 10, 2025

Related U.S. Application Data

(63) Continuation of application No. PCT/EP2023/060358, filed on Apr. 20, 2023.

(30) Foreign Application Priority Data

Apr. 21, 2022  (EP) ..................................... 22169346

(51) Int. Cl.
*B23K 26/38*     (2014.01)
(52) U.S. Cl.
CPC .................................... *B23K 26/38* (2013.01)
(58) Field of Classification Search
CPC ... B23K 26/08; B23K 26/36; B23K 2101/002
See application file for complete search history.

(56) References Cited

U.S. PATENT DOCUMENTS

| | | | |
|---|---|---|---|
| 2011/0095005 A1 | 4/2011 | Brunner | |
| 2014/0008341 A1* | 1/2014 | Krumm | B23K 26/38 219/121.78 |
| 2014/0263212 A1 | 9/2014 | Zhang | |
| 2014/0299785 A1* | 10/2014 | Krause | G01N 1/32 219/121.72 |
| 2017/0113304 A1* | 4/2017 | Pluss | B23K 26/0861 |
| 2021/0146477 A1* | 5/2021 | Krumm | B23Q 1/4814 |
| 2021/0402520 A1* | 12/2021 | Frei | B23K 26/08 |

FOREIGN PATENT DOCUMENTS

| | | | | |
|---|---|---|---|---|
| DE | 102018125436 A | | 4/2020 | |
| WO | WO-2020078782 A1 * | | 4/2020 | ............. B23K 26/08 |

* cited by examiner

*Primary Examiner* — Thien S Tran
(74) *Attorney, Agent, or Firm* — Von Rohrscheidt Patents

(57) ABSTRACT

A method for laser machining a workpiece, the method including producing a predetermined workpiece surface on the workpiece by removing material from the workpiece through a laser beam of a laser of a laser machining device, wherein the laser machining device is configured to align the workpiece received in the workpiece fixing device relative to the laser beam and to move the laser beam relative to the workpiece; aligning the workpiece and the laser beam of the laser relative to one another during the machining so that the beam axis of the laser beam encloses an angle α between 1° and 10° with a tangent to the predetermined workpiece surface in a respective point where the beam axis of the laser beam intersects the predetermined workpiece surface.

10 Claims, 14 Drawing Sheets

METHOD FOR LASER MACHINING A WORK PIECE

RELATED APPLICATIONS

This application is a continuation of international patent application PCT/EP2023/060358 filed on Apr. 20, 2023 claiming priority from European patent application 22 169 346.8 filed on Apr. 21, 2022, both of which are incorporated in their entirety by this reference.

FIELD OF THE INVENTION

The invention relates to a method for laser machining a workpiece.

BACKGROUND OF THE INVENTION

It is known that workpieces are machined using short intense laser pulses. The high power density laser beam causes the material on the surface of the workpiece to heat up. The surface of the workpiece reaches such a high temperature locally that the material of the workpiece evaporates or sublimates. At high laser power densities, a plasma of electrons and ions is created from the ablated material. The removal of material is also known as laser ablation or laser vaporization. For example, the material can be removed in layers. It is also possible to cut a workpiece using continuous or pulsed laser radiation. This is known as laser cutting or laser beam cutting. The parameters of the laser beam must be adapted to the material to be machined and the desired machining. Laser beam parameters include wavelength and average power. If the laser beam is pulsed, the parameters also include pulse energy and pulse duration.

For laser machining, the laser beam and the workpiece are aligned in a defined manner relative to one another and, if necessary, moved to remove material within predefined areas of the workpiece and to form certain contours on the surface of the workpiece. This includes the creation of cutting or other edges on workpieces.

A laser machining machine is provided with a laser that produces a laser beam. The laser beam travels along a beam axis. The beam axis is a geometric straight line. The laser includes a laser head that directs the laser beam with its beam axis onto a workpiece and, if necessary, moves it over the surface of a workpiece within a predefined contour. The workpiece is placed in an alignment and positioning device, also known as a fixture in the case of a machine tool. This device is provided with of a device base, a workpiece fixing device and a moving device. The device base is stationary. It may be part of the machine base of the laser machining machine. The workpiece fixing device receives and clamps the workpiece so that the position of the workpiece relative to the workpiece fixing device does not change during machining of the workpiece. The moving device ensures that the workpiece fixing devices moves relative to the device base. Since the laser head of the laser machining machine is usually fixed in relation to the machine base, the moving device also provides relative movement between the laser head on the one hand and the workpiece fixing device on the other hand. Accordingly, a workpiece clamped to the workpiece fixing device is moved relative to a laser beam generated by the laser head. Thanks to the relative movement triggered by the moving device, a workpiece can be machined over its entire surface, insofar as the surface of the workpiece is not covered by the workpiece fixing device. During machining, the workpiece is aligned with its surface at various angles to the laser beam. The laser head can be fitted with a deflector, which uses optical components to deflect the laser beam, causing it to move at high speed across the surface of the workpiece. The deflector thus provides additional relative movement between the laser beam and the workpiece.

In order to machine a workpiece, the laser beam is usually directed with its beam axis towards a workpiece to be machined, so that the beam axis is perpendicular to a surface of the workpiece. This is illustrated in FIG. 1. FIG. 1 shows a workpiece 1 and a laser beam 3 with a beam axis 5. FIGS. 2 and 3 show the impact point 2 at which the laser beam 3 strikes a plane surface 1a of the workpiece 1. The energy density of the laser beam 3 is greater at its center than at the edge of the laser beam 3. Accordingly, the temperature at the center of the laser beam 3 is higher than at the edge. This means that more material is removed from the workpiece at the center of the impact point 2 than at the edge of the impact point 2. If the laser beam 3 is not moved relative to the workpiece 1, the laser beam 3 creates a round depression 4 in the surface of the workpiece 1. This has the shape of part of a spherical shell or an ellipsoid. The depression 4 is deeper in the center than at the edge. A plume or flame 8 formed on the surface of the workpiece 1 under the influence of the laser beam 3 contains the evaporated or sublimated material of the workpiece as well as dust and other particles. FIG. 4 shows that the flame 8 has an opening angle γ. When the laser beam 3 is moved relative to the workpiece along a path on the surface 1a of the workpiece 1, a sequence of spatially offset depressions 4 is created, which together form a furrow 10. An edge 9 is formed at the transition between the plane surface 1a and the furrow 10. The furrow 10 has an opening angle γ. If an edge, e.g. a cutting edge, is to be produced on the workpiece 1 with the aid of the laser beam 3 or the workpiece is to be cut, the laser beam 3 is moved back and/or forth several times along the path relative to the workpiece 1 until the furrow 10 has the required depth. With each movement, the furrow 10 created by the laser beam 3 becomes deeper and wider. This is illustrated in FIGS. 7 and 8. The two FIGS. show that the furrow 10 merges with the furrow 10' as a result of the additional material removed by the laser beam. FIG. 8 shows particularly clearly that the furrow 10 becomes not only deeper but also wider due to the opening angle γ of the flame 8. With each movement of the laser beam 3 along the path, the edge 9 created at the edge of the flame 8 on the surface 1a of the workpiece 1 moves laterally. As a result, the edge 9 is not necessarily in the intended position at the end of the laser machining. The surface 7 moves accordingly. In addition, dust, and sublimated material from the workpiece 1 is deposited on the surface 1a in the edge area of the flame 8. This results in a poor surface quality of the workpiece in the area of the edge 9.

BRIEF SUMMARY OF THE INVENTION

The underlying objective of the invention is to provide a method for laser machining of a workpiece, by means of which a workpiece surface can be produced at a precisely defined position, and in which the workpiece surface produced has a high surface quality.

This objective is achieved by a method according to the independent claim. The method according to the invention is characterized in that the workpiece and the laser beam are aligned with respect to one another in such a way that the geometric beam axis of the laser beam during the machining, at the point where the beam axis intersects the workpiece surface to be produced, encloses an angle α between 1° and 10° with a tangent to the workpiece surface to be produced at this point. This causes the cloud or flame that forms on the surface of the workpiece under the influence of the laser beam to also be inclined at its opening angle to the surface of the workpiece. Advantageously, the angle α corresponds to the opening angle γ of the flame. Orienting the beam axis of the laser beam at the angle α against the tangent to the workpiece surface to be produced prevents vaporized or sublimated material from being deposited on the workpiece surface to be produced and also prevents this workpiece surface from being burned in an undesirable manner. As a result, the surfaces adjacent to the created edge have good surface quality after laser machining.

A further advantage of the method according to the invention is that the workpiece surface to be produced is created exactly at the specified position with the exactly specified geometry by selective material removal using the laser. In contrast to known methods, the workpiece surface to be produced by material removal does not shift during laser machining.

The material is not removed in layers during laser machining because the laser is not aligned perpendicular to the surface of the workpiece. Instead, a portion of the workpiece is removed to create the workpiece surface.

According to an advantageous embodiment of the invention, during laser machining, the laser beam and the workpiece are moved relative to another in such a way that a portion of the workpiece is removed. During material removal, the workpiece surface to be produced is created at the interface with the removed portion of the workpiece. If the portion to be removed is thin, the material removed from the workpiece will evaporate completely. The material is removed along a predetermined path, while maintaining the orientation of the beam axis relative to the respective tangent to the workpiece surface to be produced at the angle α. In this way, the workpiece can be cut or an edge can be created. For this purpose, the laser beam is guided along the path several times until the desired workpiece surface has been completely generated.

According to a further advantageous embodiment of the invention, the angle α is determined as a function of the material of the workpiece, the wavelength of the laser and the average power of the laser. These parameters determine the opening angle γ of the flame formed on the surface of the workpiece under the action of the laser beam.

According to a further advantageous embodiment of the invention, the laser is a pulsed laser. With a pulsed laser, a particularly high energy density can be achieved within the short pulse duration and thus a particularly high surface temperature can be generated on the workpiece. The temperature does not spread significantly within the workpiece by heat conduction within the short pulse duration because the energy transport by heat conduction is very slow compared to the pulse duration. As a result, the energy transferred to the workpiece by the laser beam is concentrated in a very thin layer. Therefore, when using a pulsed laser, the surface of the workpiece reaches a particularly high temperature in a spatially limited manner and the material evaporates abruptly.

According to a further advantageous embodiment of the invention, when using a pulsed laser, the angle α is determined not only as a function of the material of the workpiece, the wavelength of the laser and the average power of the laser, but also as a function of the pulse duration and the pulse energy of the pulsed laser.

According to a further advantageous embodiment of the invention, a flame is generated on the surface of the workpiece by the laser beam, whereby the flame contains sublimated material of the workpiece and whereby the flame has an opening angle γ dependent of the material of the workpiece and oft the laser beam. The angle α between the beam axis of the laser beam and a tangent to the surface of the workpiece to be produced is set so as to correspond to the angle γ. This allows a workpiece surface of particularly high quality to be produced.

According to a further advantageous embodiment of the invention, the laser beam is focused on the workpiece, whereby the focal point of the focused laser beam is located at the point where the beam axis intersects the workpiece surface to be produced.

According to a further advantageous embodiment of the invention, the workpiece surface to be produced is a plane surface.

According to a further advantageous embodiment of the invention, the workpiece surface to be produced is a curved surface. The moving device rotates the workpiece received in the workpiece fixing device about a workpiece axis of rotation during laser material removal.

According to a further advantageous embodiment of the invention, the removal of material from the workpiece is carried out with the alignment of the laser beam at a constant angle α relative to the workpiece. The alignment of the laser beam relative to the workpiece thus remains the same during the entire material removal machine. This is suitable, for example, when producing plane surfaces and when the workpiece has a certain symmetry with respect to the axes of motion of the laser machining device.

According to a further advantageous embodiment of the invention, the angle α is varied within the angular range $1° \leq \alpha \leq 10°$ during the removal of material from the workpiece. This means that the alignment of the laser beam relative to the workpiece changes, with the angle α remaining within the predetermined angular range. Such an angular change can occur when the laser beam is additionally guided in closed or open curves along a laser path during material removal, when irregularly shaped or non-planar surfaces are produced, or when the workpiece is arranged in a particular orientation relative to the axes of motion of the moving device of the laser machining device. Of particular importance is a workpiece rotation axis, around which the workpiece fixing device rotates, and thus the workpiece received in the workpiece fixing device.

According to a further advantageous embodiment of the invention, the laser beam is moved relative to the surface of the workpiece, wherein the angle α between the beam axis and the tangent to the workpiece surface to be produced is within the angular range $1° \leq \alpha \leq 10°$ during the relative movement. The relative movement is a superposition of a first movement and a second movement. The first movement causes the laser beam to move between a first point A on the surface of the workpiece and a second point B on the surface of the workpiece. During the second movement, the laser beam is moved within a closed or open curve, wherein the extent of the curve is small compared to the distance covered by the laser beam from point A to point B. The additional loop-shaped second movement increases the area of material removal during the first movement.

Other advantages and advantageous embodiments of the invention will be found in the following description, drawings, and claims.

BRIEF DESCRIPTION OF THE DRAWINGS

The drawings show a known method of laser machining a workpiece and a method of laser machining according to the invention. They show

DETAILED DESCRIPTION

FIGS. 1 to 8 show a known method of laser machining of a workpiece, in which the laser beam 3 is aligned with its beam axis 5 perpendicular to the plane surface 1a of the workpiece 1. This known method is explained in the introductory description above.

Figure 1:
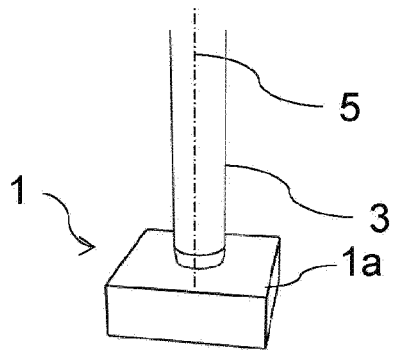
FIG. 1: Perspective view of a workpiece with a laser beam in a known method of laser machining.
Figure 2:
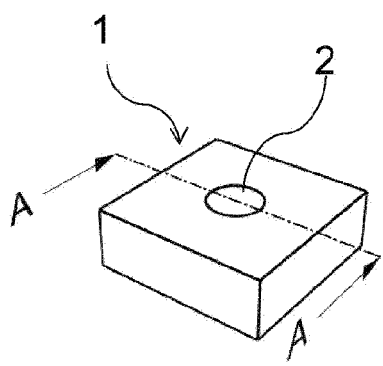
FIG. 2: Workpiece according to FIG. 1 in another perspective view.
Figure 3:
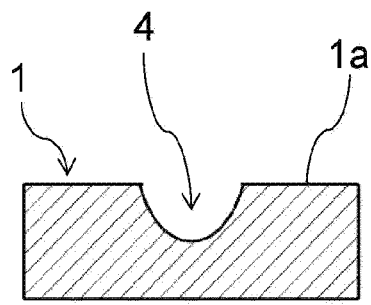
FIG. 3: Workpiece according to FIGS. 1 and 2 in longitudinal section along the plane marked A-A in FIG. 2, FIG. 4: Workpiece shown in FIG. 3 in cross-section with a flame containing sublimated material.
Figure 4:
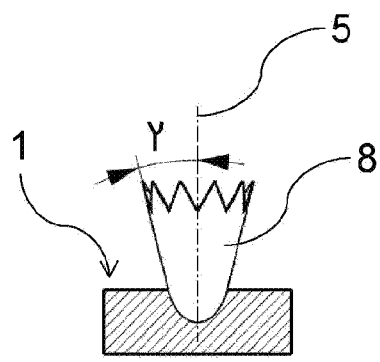
Figure 5:
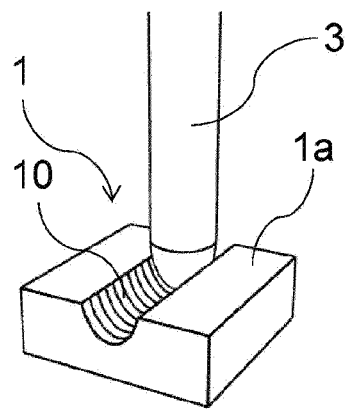
FIG. 5: Workpiece of FIGS. 1 to 4 in which a depression has been produced along a path of the laser beam.
Figure 6:
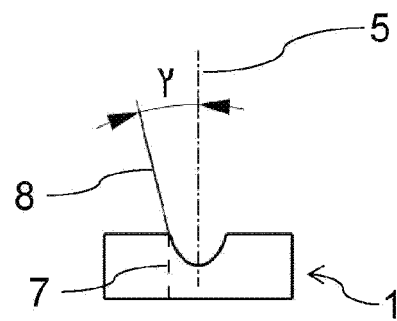
FIG. 6: Front view of the part shown in FIG. 5, FIG. 7: Workpiece in perspective view, where the laser beam has been moved several times along the path.
Figure 7:
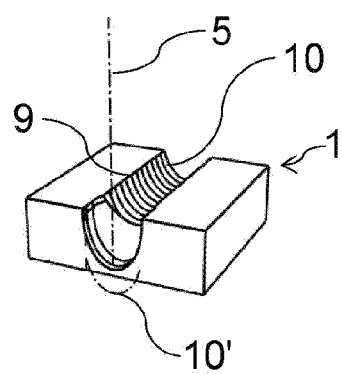
Figure 8:
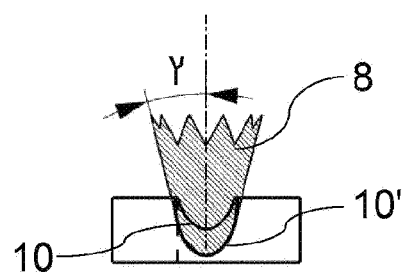
FIG. 8: Front view of the workpiece shown in FIG. 7, FIG. 9: Workpiece with laser beam directed according to the invention.
Figure 9:
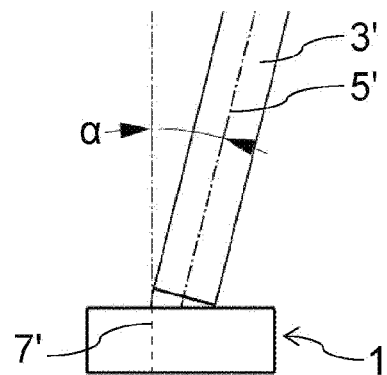
Figure 10:
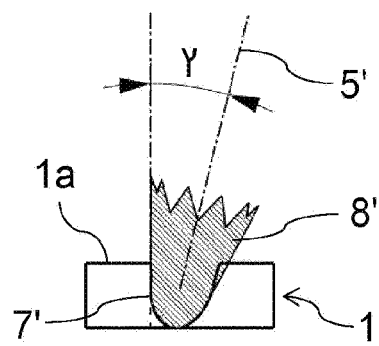
FIG. 10: Workpiece in longitudinal section during laser machining according to FIG. 9, FIG. 11: Second workpiece on which a plane workpiece surface is produced by the method according to the invention.

FIGS. 9 and 10 show the method according to the invention. The workpiece surface 7' to be produced is a flat surface. Therefore, the tangent to this workpiece surface to be produced runs in the surface. In the present example, the workpiece surface 7' to be produced is perpendicular to the surface 1a of the workpiece. Contrary to the known method according to FIGS. 1 to 8, in the method according to the invention according to FIGS. 9 and 10, the laser beam 3' is not directed with its beam axis 5' parallel to the surface 7' to be produced and at 90° to the plane surface 1a of the workpiece 1, but at an angle α to the plane workpiece surface 7' to be produced. FIG. 10 shows the cloud or flame 8' generated by the laser beam 3' when it strikes the workpiece 1 and containing sublimated material from the workpiece 1. The flame 8' has an opening angle γ. The angle γ does not correspond to the full opening angle of the conical flame, but only to the opening angle of the conical flame in relation to the beam axis 5'. The laser beam is aligned with its beam axis 5' so that the angle α corresponds to the angle γ. This ensures that the left flank of the flame 8' is parallel to the workpiece surface 7' to be produced, as shown in FIG. 10. This means that the laser beam 3' can be used to create exactly the surface 7', with the edge between the surface 7' and the surface 1a not moving during the laser machining.

Figure 11:
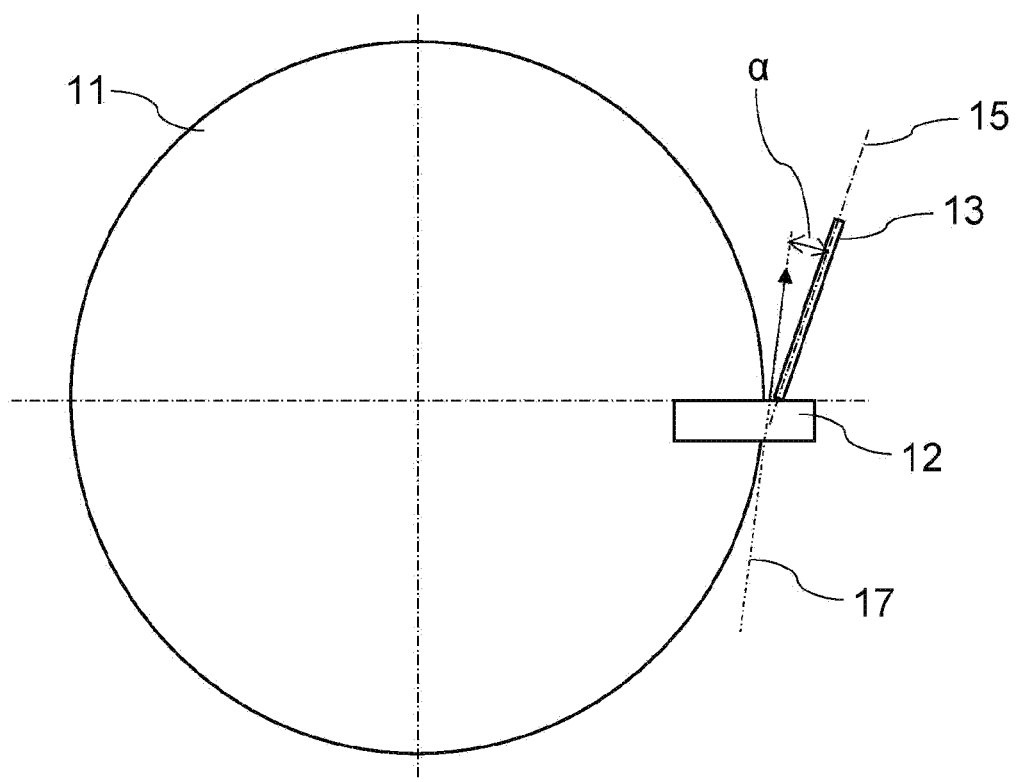
Figure 12:
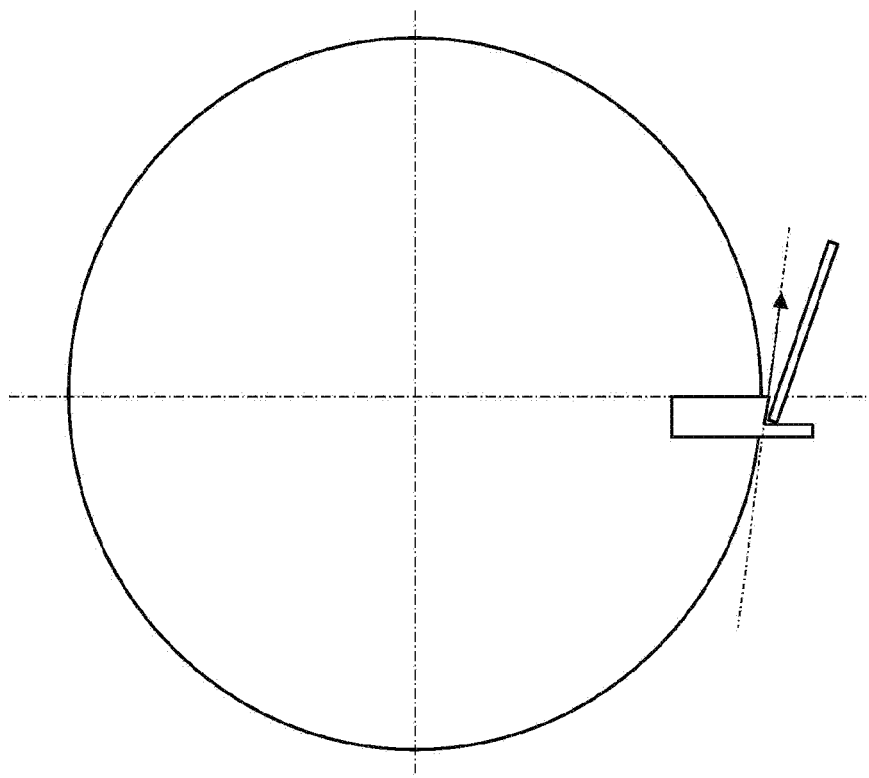
FIG. 12: Workpiece according to FIG. 11 with partially removed material.
Figure 13:
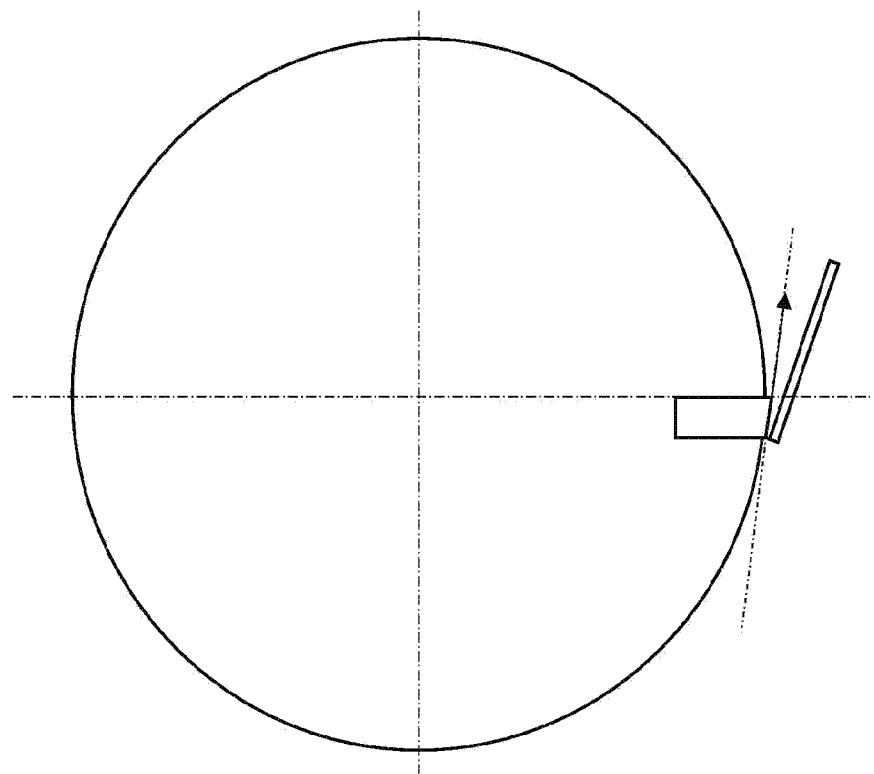
FIG. 13: Workpiece according to FIG. 11 from which the material has been completely removed.

FIGS. 11 to 13 show a second workpiece 11 on which a predetermined workpiece surface 17 is produced by the method according to the invention. The workpiece 11 is cylindrical with a circular cross-section. It is shown in cross-section in FIGS. 11 to 13. The workpiece 11 has an insert 12 on which a predetermined plane workpiece surface is produced by material removal with the laser beam 13 having a beam axis 15. For this purpose, a part of the insert 12 is removed. The beam axis 15 of the laser beam 13 is aligned with the workpiece 11 in such a way that the beam axis 15 forms the angle α with the tangent 17 to the workpiece surface to be produced. FIG. 12 shows the workpiece 11 after part of the insert 12 has been removed by the laser beam 13. FIG. 13 shows the workpiece at the end of laser machining. The surface to be produced is a plane surface. The tangent 17 therefore lies in the plane formed by this surface. FIGS. 11 to 13 show that the angle α remains constant throughout the laser machine. In this way, for example, a flank surface can be produced on a cutting tool.

Figure 14:
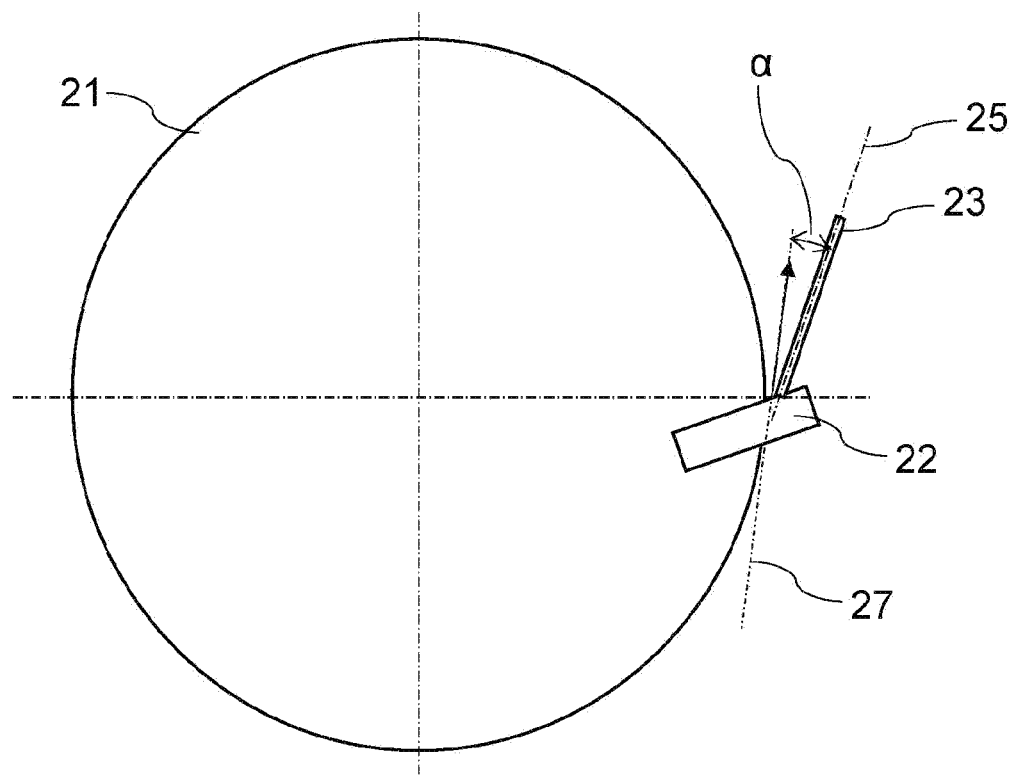
FIG. 14: Third workpiece on which a plane workpiece surface is produced by means of the method according to the invention.
Figure 15:
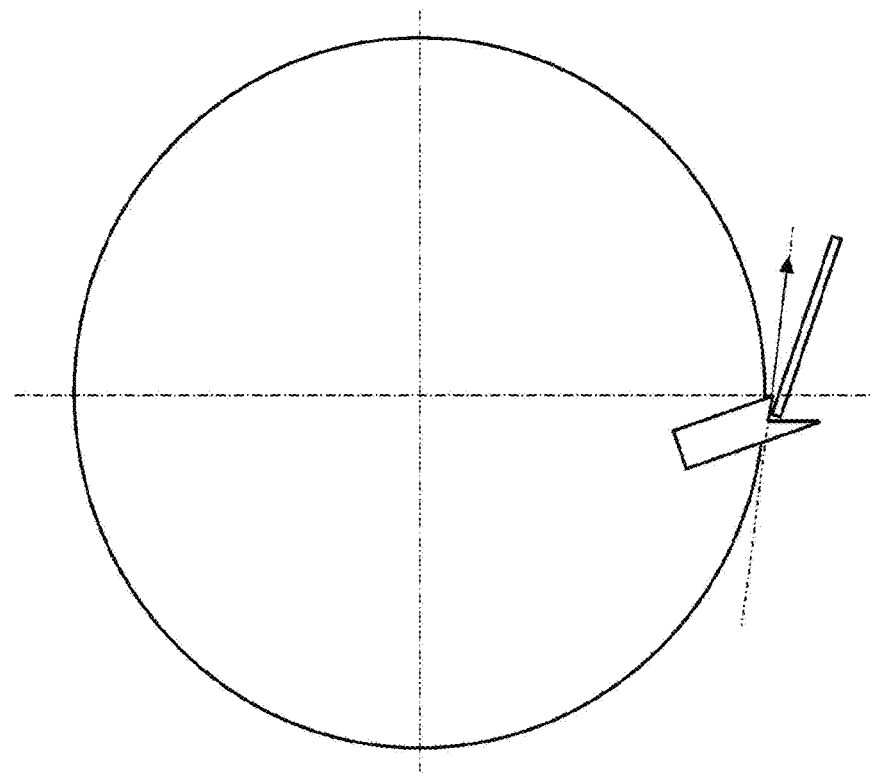
FIG. 15: Workpiece shown in FIG. 14 with some of the material removed.
Figure 16:
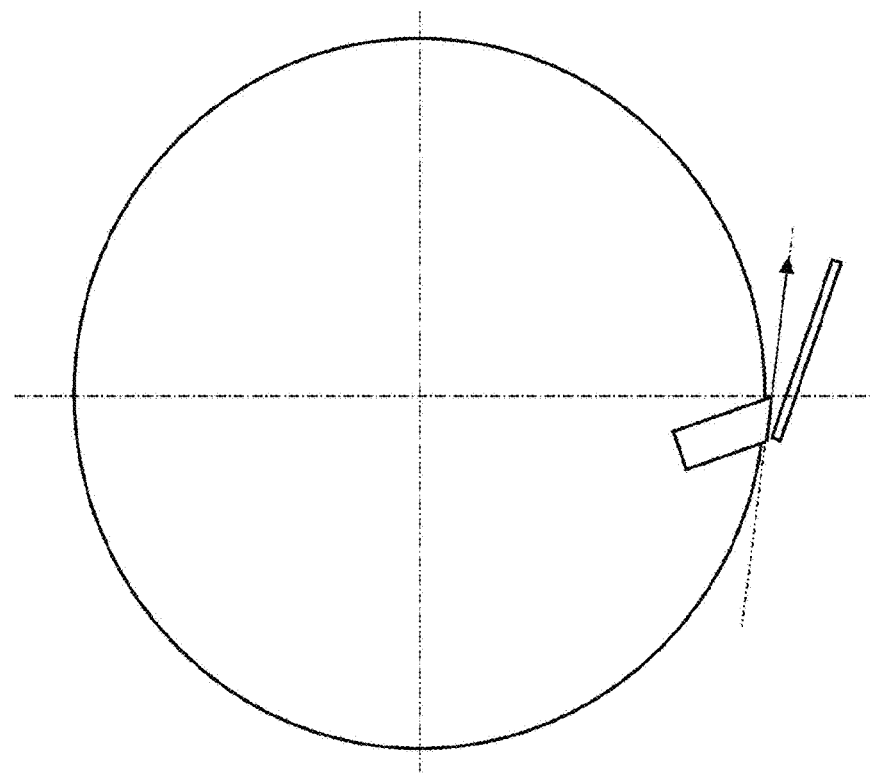
FIG. 16: Workpiece according to FIG. 14 with the material completely removed.

FIGS. 14 to 16 show a third workpiece 21 with an insert 22 on which a predetermined plane workpiece surface is produced by the method according to the invention. As the workpiece surface to be produced is a plane surface, the tangent 27 to the workpiece surface to be produced runs in the workpiece surface. The laser beam 23 is aligned with its beam axis 25 at an angle α to the tangent 27 to the workpiece surface to be produced. Like the second workpiece 11, the third workpiece 21 is cylindrical with a circular cross-section. It differs from the second workpiece 11 in that the insert 22 of the third workpiece 21 is inserted into the workpiece with a different orientation.

Figure 17:
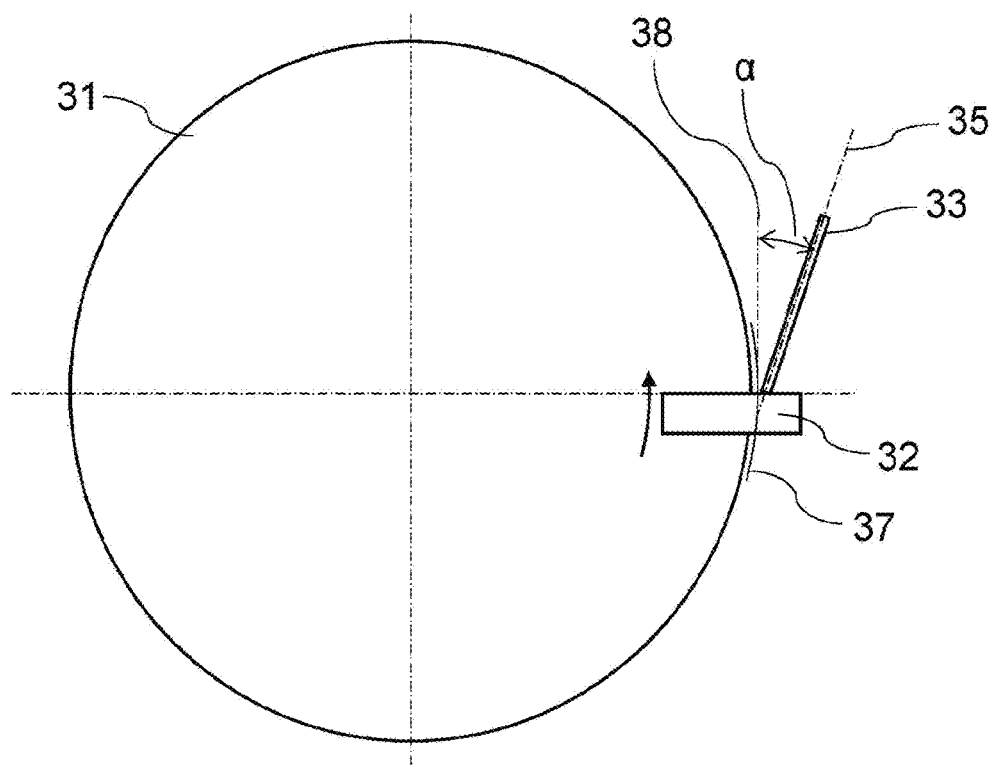
FIG. 17: Fourth workpiece on which a curved workpiece surface is produced by the method according to the invention.
Figure 18:
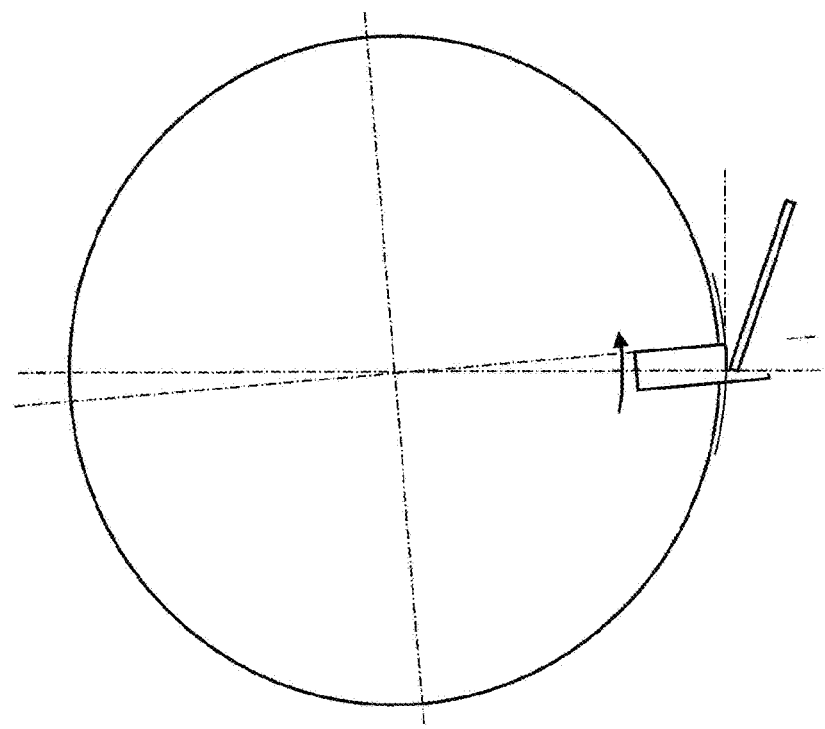
FIG. 18: Workpiece according to FIG. 17 with partially removed material.
Figure 19:
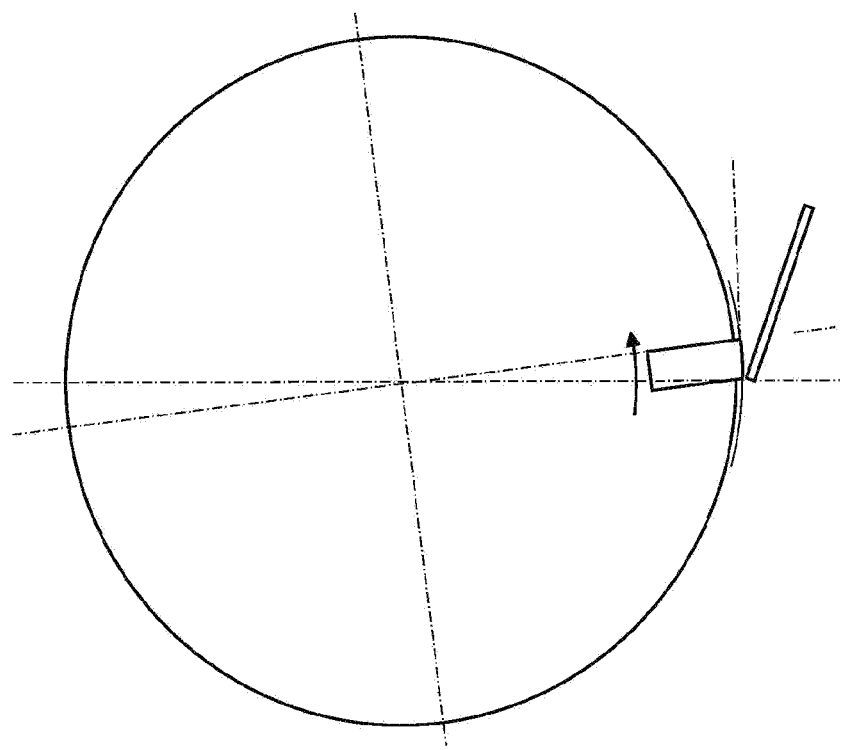
FIG. 19: Workpiece according to FIG. 17, in which the material has been completely removed.

FIGS. 17 to 19 show a fourth workpiece 31 with an insert 32 on which a curved workpiece surface is produced, the course of which is indicated by a curve in FIG. 17. This is achieved by rotating the workpiece 31 about a longitudinal axis of the workpiece during laser machining. The laser beam 33 with its beam axis 35 is always directed at an angle α to the tangent 38 to the curved surface. The angle α remains constant during material removal. In this way, for example, a guide phase can be produced on a cutting tool.

Figure 20:
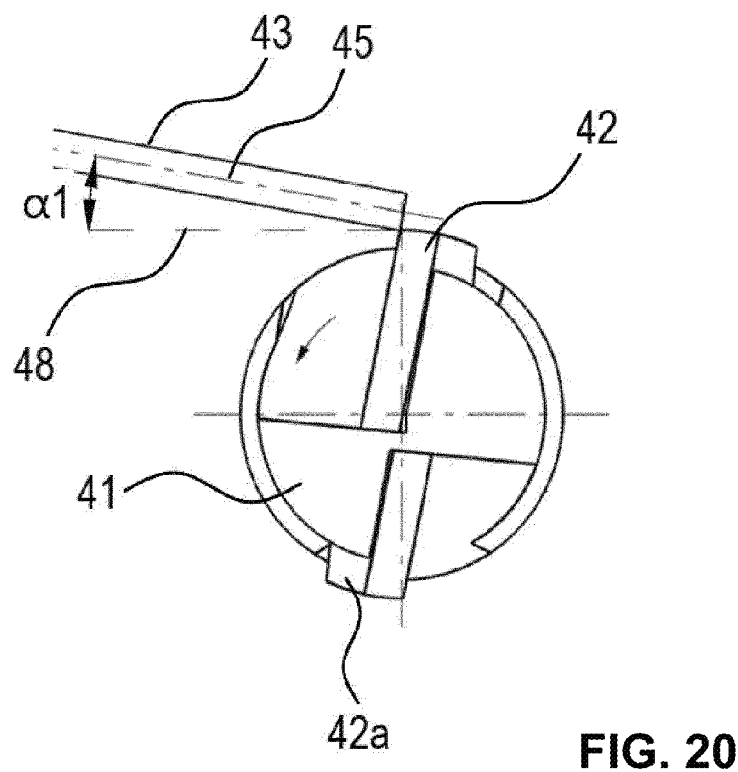
FIG. 20: Fifth workpiece on which a curved workpiece surface is produced by means of the method according to the invention, wherein the workpiece is shown in a front view at the beginning of the laser machining.
Figure 21:
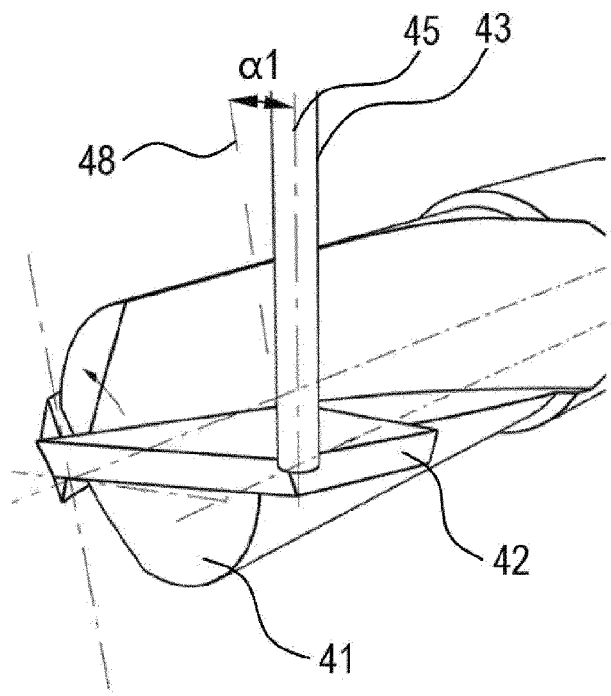
FIG. 21: Perspective view of the part shown in FIG. 20, FIG. 22: Workpiece shown in FIG. 20 at a later stage of laser machining.
Figure 22:
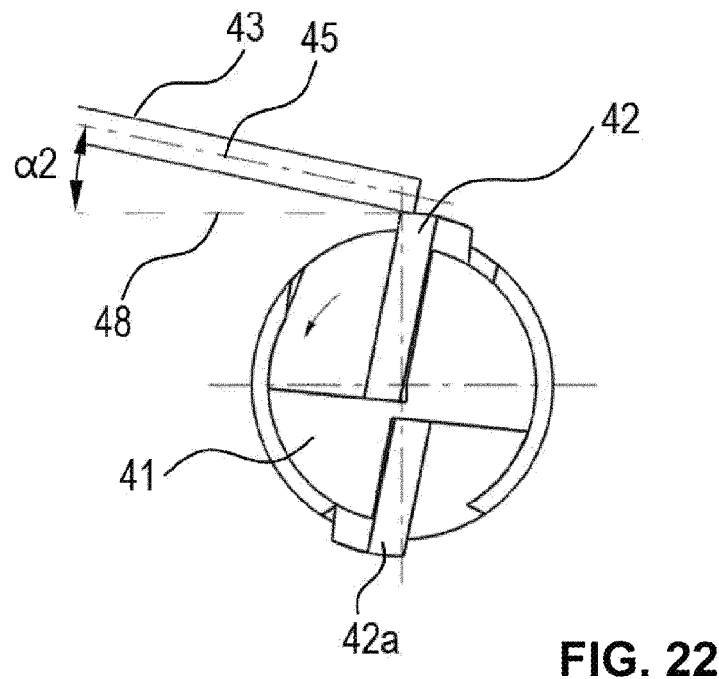
Figure 23:
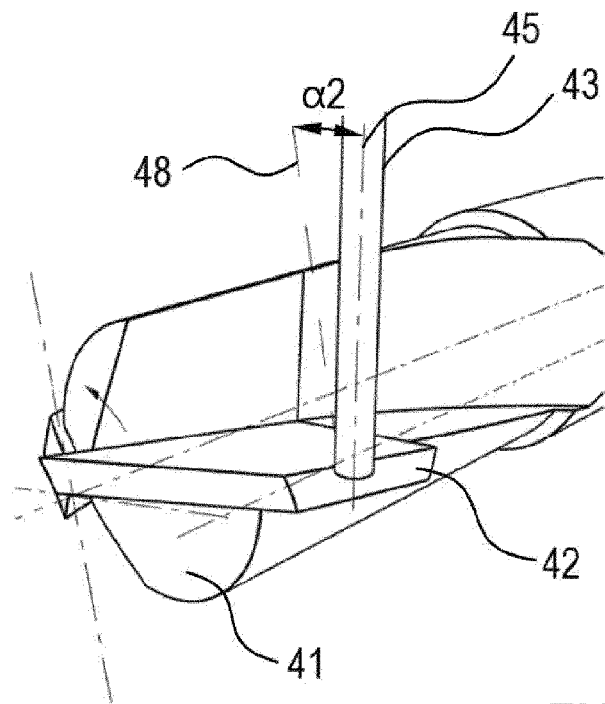
FIG. 23: Workpiece shown in FIG. 22 in perspective view, FIG. 24 Workpiece shown in FIG. 20 at a second, later stage of laser machining.
Figure 24:
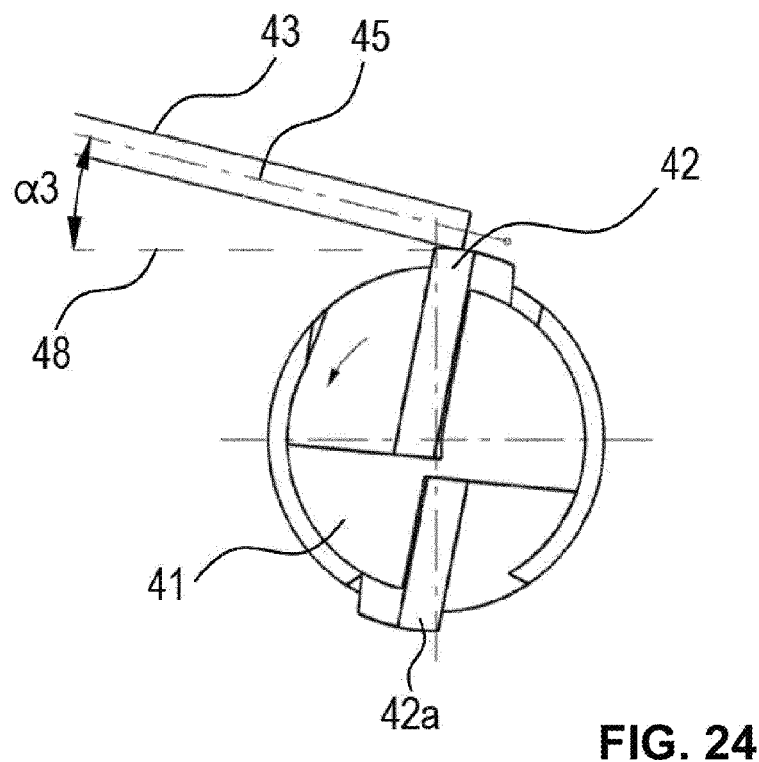
Figure 25:
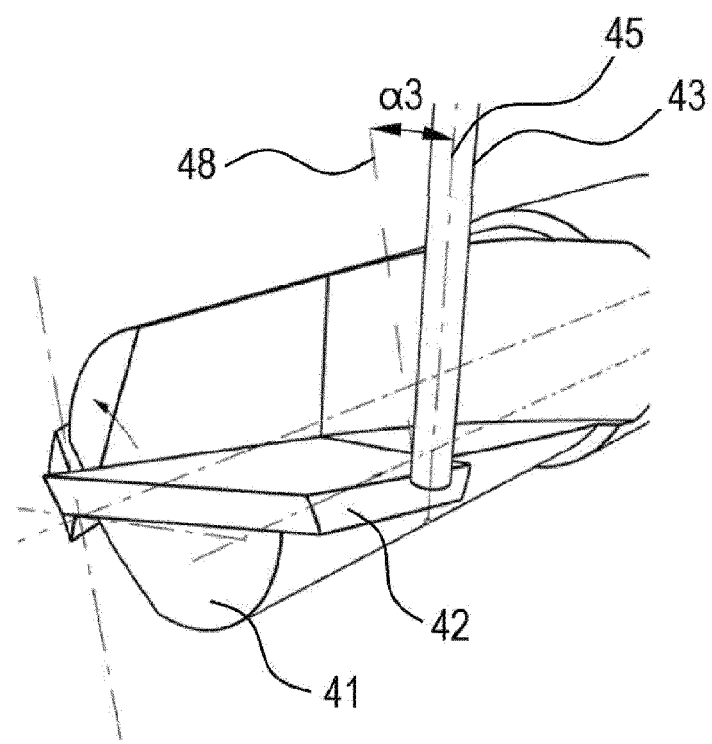
FIG. 25: Workpiece as in FIG. 24 in perspective view.
Figure 26:
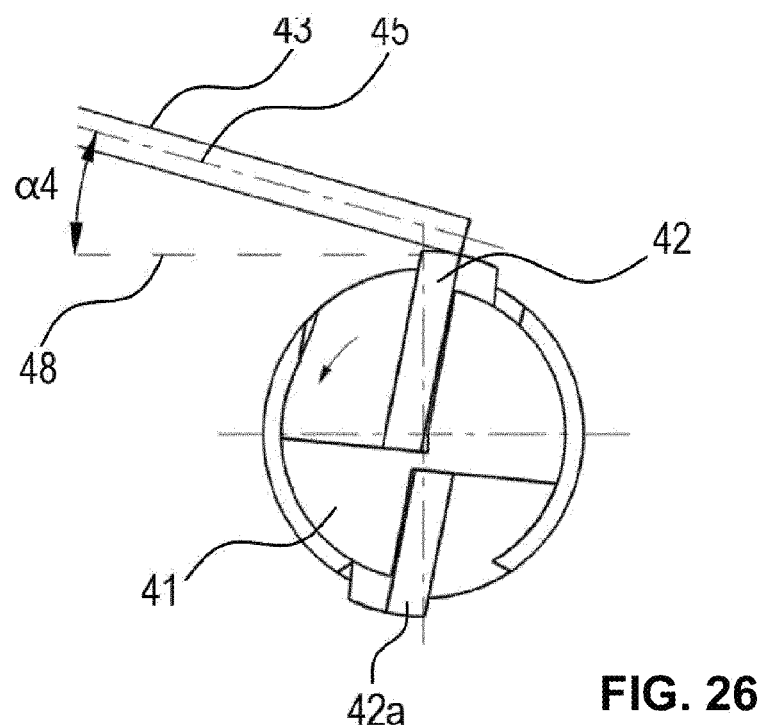
FIG. 26: Workpiece shown in FIG. 20 at a third, later stage of laser machining.
Figure 27:
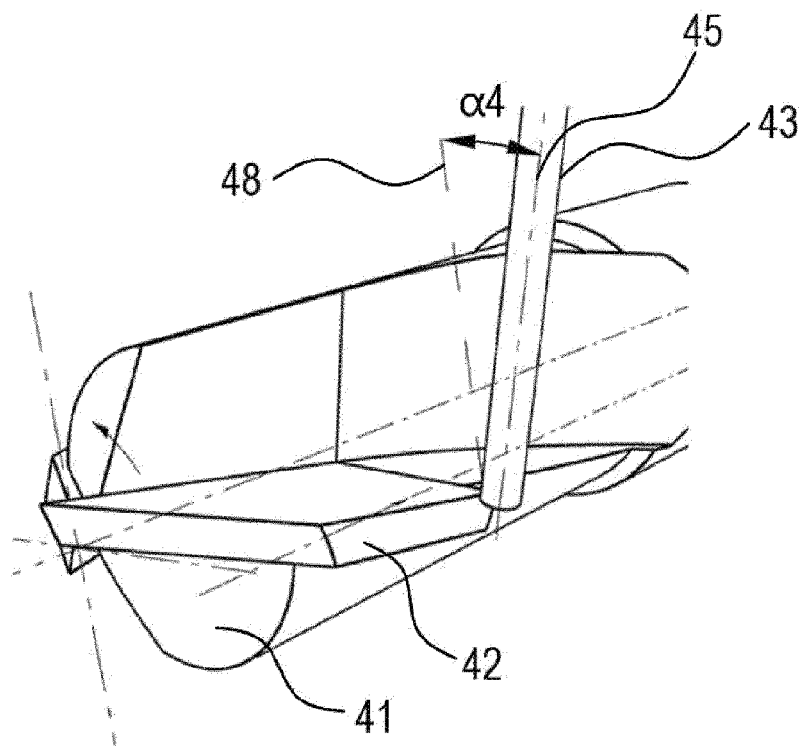
FIG. 27: Workpiece according to FIG. 26 in perspective view.

FIGS. 20 to 27 show a fifth workpiece 41 with two inserts 42, 42a on which a curved workpiece surface is produced. The beam axis 45 of the laser beam 43 always forms an angle α with the tangent 48 at the point where the laser beam strikes the surface of the workpiece 41 and the beam axis 45 intersects the workpiece surface at this point. The special feature of the inserts 42, 42a is that they are not aligned parallel to the longitudinal axis of the workpiece 41. During laser machining, the workpiece 41 is therefore rotated about its longitudinal axis by the laser beam 43. This rotation is necessary, on the one hand, to produce the curved workpiece surface in a plane perpendicular to the longitudinal axis of the workpiece 41 and, on the other hand, to produce the workpiece surface of the inserts 42, 42a in the axial direction of the workpiece 41. FIGS. 20 and 21 show the workpiece 41 at the beginning of the laser machining in two different views. The laser beam 43 with its beam axis 45 is directed at an angle α1 against the tangent 48 to the surface of the insert 42 of the workpiece 41. FIGS. 22 and 23 show the workpiece 41 at an advanced stage of laser machining. FIG. 23 shows that the beam axis 35 of the laser beam 43 has been moved along the insert 42 of the workpiece 41. The beam axis 45 of the laser beam 43 forms an angle α2 with the tangent 48 to the workpiece surface, which is different from α1. FIGS. 24 and 25 show the workpiece 41 at an even later point in the laser machining machine. The laser beam 43 has moved further along the surface of the insert 42 of the workpiece 41. The beam axis 45 of the laser beam 43 forms an angle α3 with the tangent 48 to the workpiece surface. FIGS. 26 and 27 show the workpiece just before the laser machining of the insert 42 of the workpiece 41 is completed. At this point the laser beam 43 is at the lower end of the insert 42. The beam axis 45 of the laser beam 43 forms an angle α4 with the tangent 48. The angles α1, α2, α3 and α4 are different, but all angles are in the range between 1° and 10°. In this case, α1<α2<α3<α4. FIGS. 20 to 27 show that the angle between the beam axis 45 of the laser beam 43 and the tangent 48 to the workpiece surface 41 can vary at the point where laser machining takes place, whereby the angle always lies in the angular range between 1° and 10°.

Figure 28:
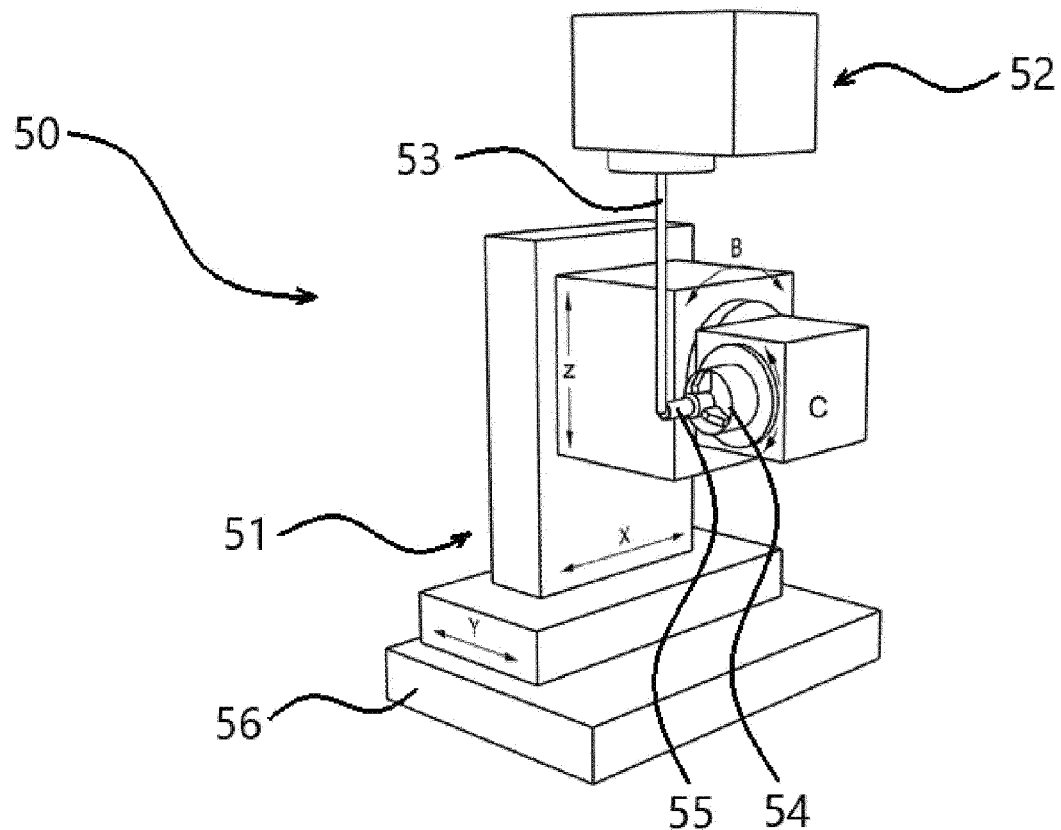
FIG. 28: Laser machining machine for carrying out the method.

FIG. 28 shows a laser machining device 50 for carrying out the method. The laser machining device 50 comprises a workpiece fixing device 54 which receives and fixes a workpiece 55, a moving device 51 which moves the workpiece 55 received in the workpiece fixing device relative to a device base 56, and a laser 52 which generates a laser beam 53 and moves it with a laser scanning device. In the present case, the moving device 51 has three linear axes X, Y, Z and two rotary axes B and C.

All of the features of the invention may be essential to the invention, both individually and in any combination.

REFERENCE NUMERALS AND DESIGNATIONS

1 Workpiece
1a Plane surface of the workpiece
2 Laser beam impact point
3, 3' Laser beam
4, 4' Depression
5,5' Beam axis
7, 7' Produced workpiece surface
8,8' Flame
9 Edge
10, 10' Furrow
11 Second workpiece
12 Insert
13 Laser beam
15 Beam axis
17 Tangent to workpiece surface
21 Second workpiece
22 Insert
23 Laser beam
25 Beam axis
27 Tangent to workpiece surface
31 Second part
32 Insert
33 Laser beam
35 Beam axis
37 Curve of workpiece surface
38 Tangent
41 Fifth workpiece
42 Insert
42a Insert
43 Laser beam
45 Beam axis
48 Tangent
50 Laser machining device
51 Moving device
52 Laser
53 Laser beam
54 Workpiece fixing device
55 Workpiece
56 Device base

What is claimed is:

1. A method for laser machining a workpiece, the method comprising:
producing a predetermined workpiece surface on the workpiece by removing material from the workpiece through a laser beam of a laser of a laser machining device including:
a device base,
a workpiece fixing device which receives and fixes the workpiece,
a moving device which moves the workpiece fixing device relative to the device base including the laser, wherein the laser beam is directed onto the workpiece with a geometric laser beam axis,
wherein the laser machining device is configured to align the workpiece received in the workpiece fixing device relative to the laser beam and to move the laser beam relative to the workpiece;
aligning the workpiece and the laser beam of the laser relative to one another during the machining so that the beam axis of the laser beam encloses an angle α between 1° and 10° with a tangent to the predetermined workpiece surface in a respective point where the beam axis of the laser beam intersects the predetermined workpiece surface;
generating a flame when the laser beam strikes the workpiece, wherein the flame is caused by the laser beam to include sublimated material of the workpiece, wherein the flame has an opening angle γ, wherein γ is a function of the material of the workpiece, a wavelength of the laser, and an average power of the laser; and
removing the material from the workpiece through the laser beam with the beam axis of the laser beam aligned relative to the tangent to the predetermined workpiece surface at the angle α, wherein $1°≤α≤10°$, and the angle α is adjusted so that it is equal to the opening angle γ.

2. The method according to claim 1,
wherein the laser beam and the workpiece are moved relative to one another during the laser machining, so that a portion of the workpiece is removed, and wherein the predetermined workpiece surface is formed at an interface with the removed portion.

3. The method according to claim 1, wherein the laser is pulsed.

4. The method according to claim 3, wherein the angle α is determined as a function of a pulse duration and a pulse energy of the laser.

5. The method according to claim 1,
wherein the laser beam is focused on the workpiece, and
wherein a focal point of the focused laser beam is located at the point where the beam axis intersects the predetermined workpiece surface.

6. The method according to claim 1, wherein the predetermine workpiece surface is a flat surface.

7. The method according to claim 1, wherein the predetermined workpiece surface is a cambered surface and the moving device rotates the workpiece received in the workpiece fixing device about a workpiece axis of rotation during the material removal through the laser.

8. The method according to claim 1, wherein the removal of the material from the workpiece is performed through the laser beam with the angle α held constant.

9. The method according to claim 1, wherein the angle α is varied within an angular range of $1° \leq \alpha \leq 10°$ during the removal of the material from the workpiece.

10. The method according to claim 1,
wherein the laser beam is moved relative to the surface of the workpiece in a relative movement,
wherein the angle α between the beam axis and the tangent to the predetermined workpiece surface is within the angular range of $1° \leq \alpha \leq 10°$ during the relative movement, and
wherein the relative movement is a superposition of a first movement and a second movement,
wherein the laser beam is moved between a first point A on the surface of the workpiece and a second point B on the surface of the workpiece during the first movement, and
wherein the laser beam is moved within a closed or open curve during the second movement, and an extension of the curve is small compared to a distance covered by the laser beam between the first point A and the second point B.

* * * * *